United States Patent
McCarthy

(10) Patent No.: US 8,577,399 B2
(45) Date of Patent: Nov. 5, 2013

(54) SYSTEMS AND METHODS FOR FACILITATING A COMMERCE TRANSACTION OVER A DISTRIBUTION NETWORK

(75) Inventor: Michael Joseph McCarthy, Marietta, GA (US)

(73) Assignee: Cox Communications, Inc., Atlanta, GA (US)

( * ) Notice: Subject to any disclaimer, the term of this patent is extended or adjusted under 35 U.S.C. 154(b) by 319 days.

(21) Appl. No.: 12/816,101

(22) Filed: Jun. 15, 2010

(65) Prior Publication Data

US 2011/0306368 A1 Dec. 15, 2011

(51) Int. Cl.
*H04W 4/00* (2009.01)

(52) U.S. Cl.
USPC ........... 455/466; 370/328; 370/338; 709/217; 705/14.4; 705/14.73; 725/131

(58) Field of Classification Search
USPC ........ 455/466, 456.1; 370/328–338; 725/131, 725/31, 5, 34, 25, 60, 118, 37, 35, 32; 705/14.73, 14.4, 14.11, 14.55, 14.27, 705/26.5–27.2
See application file for complete search history.

(56) References Cited

U.S. PATENT DOCUMENTS

| | | | |
|---|---|---|---|
| 6,606,481 B1 | 8/2003 | Tegler et al. | |
| 7,054,654 B1 | 5/2006 | Sladek et al. | |
| 7,533,404 B2 | 5/2009 | Sinz et al. | |
| 7,571,451 B2 | 8/2009 | Bertram | |
| 7,607,152 B1 | 10/2009 | Gordon et al. | |
| 7,636,578 B1 | 12/2009 | Cope et al. | |
| 7,669,218 B1 | 2/2010 | Groff et al. | |
| 2006/0053050 A1 | 3/2006 | Schweier | |
| 2006/0218613 A1 | 9/2006 | Bushnell | |
| 2007/0037591 A1 | 2/2007 | Choe et al. | |
| 2007/0094692 A1* | 4/2007 | de Heer | 725/87 |
| 2008/0119167 A1* | 5/2008 | Rao | 455/411 |
| 2008/0254817 A1 | 10/2008 | Tornkvist | |
| 2009/0069040 A1 | 3/2009 | Wiesmuller et al. | |
| 2009/0094643 A1 | 4/2009 | Pickelsimer et al. | |
| 2009/0254446 A1 | 10/2009 | Chernyak | |
| 2009/0313664 A1 | 12/2009 | Patil et al. | |
| 2010/0011403 A1 | 1/2010 | Parnell et al. | |
| 2011/0163939 A1* | 7/2011 | Tam et al. | 345/2.3 |

* cited by examiner

*Primary Examiner* — Chuong A Ngo
(74) *Attorney, Agent, or Firm* — Sutherland Asbill & Brennan LLP

(57) ABSTRACT

Embodiments of the invention include systems and methods for facilitating a commerce transaction over a distribution network. According to one embodiment, a method for facilitating a purchase transaction over a distribution network is provided. The method may include transmitting advertisement content associated with at least one product or service to a viewer device associated with a viewer, wherein the advertisement content presents at least one commerce command. The method may further include receiving a selection of the at least one commerce command selected by the viewer and transmitting at least one message to initiate a commerce transaction for the at least one product or service with a marketplace system responsive to receiving the selection of the at least one commerce command.

23 Claims, 9 Drawing Sheets

SYSTEMS AND METHODS FOR FACILITATING A COMMERCE TRANSACTION OVER A DISTRIBUTION NETWORK

FIELD OF THE INVENTION

Aspects of the invention relate generally to distribution networks, and more particularly, to systems and methods that facilitate a commerce transaction over a distribution network.

BACKGROUND OF THE INVENTION

Content distribution networks (also referred to interchangeably herein as "distribution networks"), such as cable, satellite, and Internet Protocol (IP) networks, provide a variety of programming content and, likely, the largest source of advertisement spending. As media capabilities increase, viewers' interactivity with their televisions and set-top boxes increases. For example, with the advent of digital cable, non-linear programming, such as on-demand content, digital video recorders (DVRs), and interactive programming guide menus, additional viewer interaction with the television is required to view the desired content.

Similarly, mobile telecommunications has experienced a rampant increase in the use of wireless phones (e.g., cellular phones) and other mobile devices for much more than just traditional voice calls. For example, wireless phones are frequently used for web browsing, tracking email, playing music and videos, taking pictures, and text messaging with other mobile devices.

In addition, online purchases and other transactions over the Internet continue to increase in popularity. For many, conducting a transaction over the Internet has become the norm, rather than an exception.

Accordingly, there exists a need to facilitate the initiation and/or completion of a commerce transaction using a distribution network. In addition, there exists a further need to facilitate commerce transactions through a combination of distribution network and wireless network messaging.

BRIEF DESCRIPTION OF THE INVENTION

Some or all of the above needs and/or problems may be addressed by certain embodiments of the invention. Embodiments of the invention may include systems and methods for facilitating a commerce transaction over a distribution network. According to one embodiment, a method for facilitating a purchase transaction over a distribution network is provided. The method may include transmitting advertisement content associated with at least one product or service to a viewer device associated with a viewer, wherein the advertisement content presents at least one commerce command. The method may further include receiving a selection of the at least one commerce command selected by the viewer and transmitting at least one message to initiate a commerce transaction for the at least one product or service with a marketplace system responsive to receiving the selection of the at least one commerce command.

According to another embodiment, a system for facilitating a purchase transaction over a distribution network is provided. The system may include a network operator system with at least one memory storing computer-executable instructions and at least one processor operable to execute the computer-executable instructions. The network operator system may include a distribution network server in communication with a viewer device associated with a viewer over a distribution network and an interactive shopping server. The at least one processor is operable to: transmit over the distribution network to the viewer device advertisement content associated with at least one product or service, wherein the advertisement content presents at least one commerce command; receive a selection of at least one commerce command selected by the viewer; and transmit at least one message to initiate a commerce transaction for at least one product or service with a marketplace system responsive to receiving the selection of at least one commerce command.

Additional systems, methods, apparatus, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Figure 1:
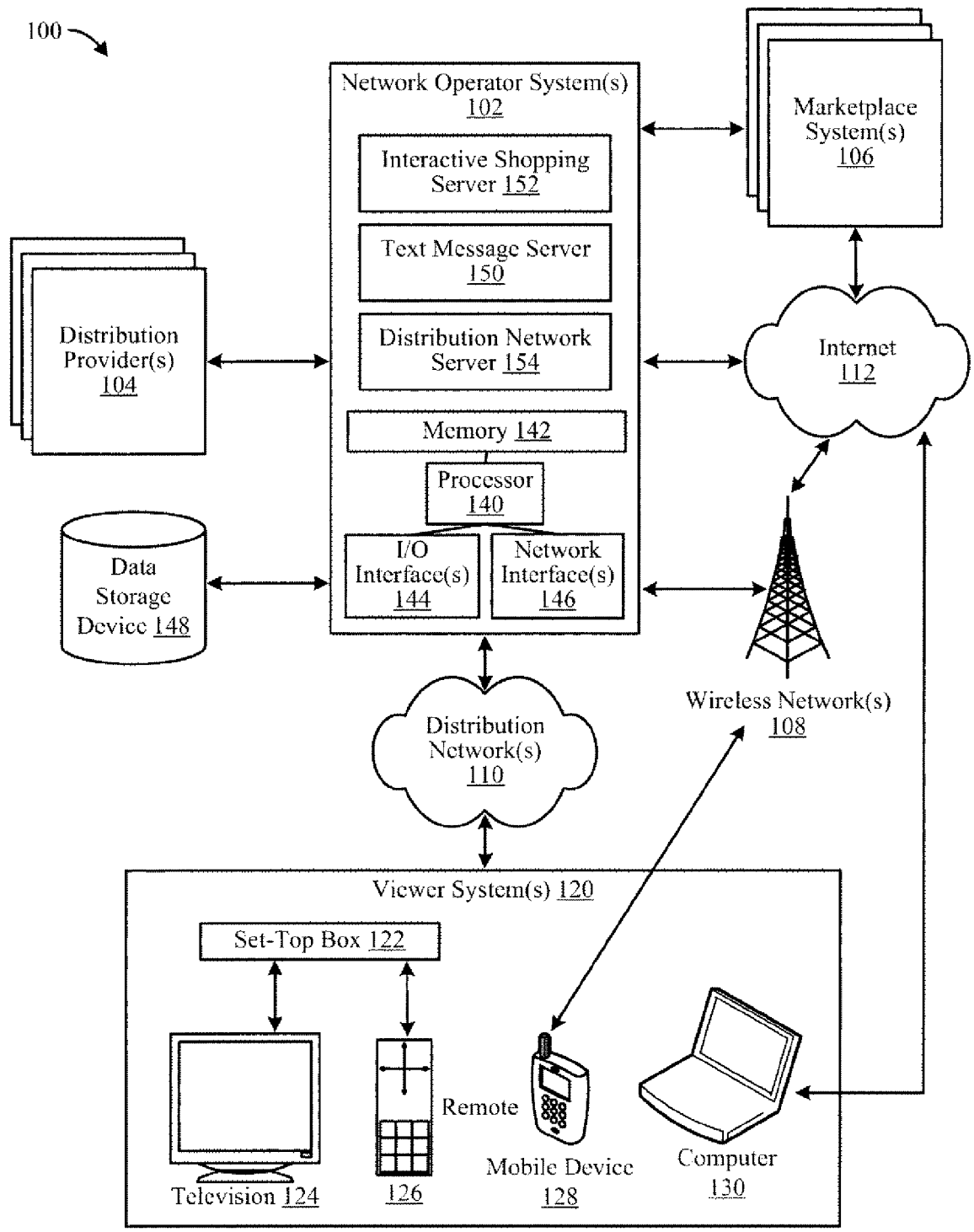
FIG. 1 illustrates an example system, according to an example embodiment of the invention.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments described herein include systems and methods for facilitating a commerce transaction over a content distribution network, such as over a cable broadcast network, a satellite broadcast network, or an IP network. A commerce transaction may include any transaction with a marketplace such as, but not limited to, a purchase of a product or service; a request for information related to a product or service; an addition of a product or service to a "my favorites" feature, a "wish list" feature, or any other designation for subsequent reference; a reminder related to a product or service; or any combination thereof. Initiating a commerce transaction may be the result of advertisement content provided over the distribution network, or otherwise coordinated in part by the distribution network. Accordingly, a distribution network operator and associated system or systems can facilitate a commerce transaction by presenting and explaining to the viewer the ability, while viewing regular programming, to interact with the network operator system to conduct a commerce transaction. The commerce transaction may be with an Internet-based marketplace (e.g., an online or web-based retailer) offering the sale of products or services over the Internet, or with any other type of marketplace, such as, but not limited to, a traditional bricks and mortar retailer, a mail-based retailer, and the like.

According to one embodiment, the viewer may interact with the network operator system via text messaging using a mobile device (e.g., a mobile phone, a smart phone, a pager, a media player, etc.) over a wireless network. In another embodiment, the viewer may interact with the network operator system over the distribution network, such as via upstream messaging sent from a viewer device (e.g., a set-top box, a television, etc.) over the distribution network to the network system. In this embodiment, the upstream messaging is generated at the viewer device in response to the user's selection from a menu or other indication using the viewer device and/or a remote control. In other embodiments, any combination of wireless communications (e.g., text messaging) and upstream messaging may be used to interact with the network operator system to facilitate the commerce transaction or transactions requested by the viewer.

Accordingly, as a result of receiving the communication from the viewer, whether it be via a wireless network or a distribution network, the network operator system may process the received communication to initiate the commerce transaction or transactions requested by the viewer. In one embodiment, the network operator system may transact directly with the desired marketplace on behalf of the viewer after receiving the viewer communication. In other embodiments, the network operator system may provide the viewer with the information for the viewer to initiate the transaction with the marketplace, such as by transmitting a hyperlink to a marketplace webpage via a text message to the viewer's mobile device. Thus, when receiving the information from the network operator, the viewer can initiate and/or complete the commerce transaction with the marketplace. For example, a hyperlink transmitted to the viewer may be to a "shopping cart" or "checkout" function generated and maintained by the marketplace system. In one embodiment, the uniform resource locator (URL) underlying the hyperlink can contain a product or service identifier as well as an indication of the desired transaction (e.g., "purchase") such that when selecting the hyperlink, the webpage displayed can be used to initiate the commerce transaction, and may optionally be automatically populated with information specific to the transaction. In another embodiment, the network operator system can initiate the transaction directly with the marketplace (e.g., via web applets, application programming interfaces, etc.), and the hyperlink merely provides a link to the viewer's account, shopping cart, checkout screen, etc., so the viewer can follow-up on the transaction as desired.

More details regarding the various means for implementing the embodiments of the invention are provided below with reference to FIGS. 1-4B.

System Overview

An example system 100 will now be described illustratively with respect to FIG. 1. The system 100 may include one or more network operators and associated network operator systems 102, one or more content providers and associated content provider systems 104, one or more marketplaces and associated marketplace systems 106, one or more wireless networks 108, one or more distribution networks 110, and one or more other networks (e.g., the Internet, wide area network, local area network, private network, public network, etc.) 112. In addition, the system 100 includes one or more viewer systems 120 in communication with one or more of the network operator systems 102, the wireless network 108, and/or the marketplace system 106. Each of the aforementioned systems or system components is configured for accessing and reading associated computer-readable media having data stored thereon and/or computer-executable instructions for implementing the various methods described herein. By executing computer-executable instructions, each of these computer systems may form a special purpose computer or a particular machine. As used herein, the term "computer-readable medium" may describe any form of computer memory or memory device.

With reference to the viewer system 120, one or more viewer devices may optionally be provided, such as a set-top box 122, a television 124 (or other display, such as a personal computer and display in an IP network, or a projector and screen, etc.), or a remote control device 126. As used herein, the term "viewer device" refers generally to any one or a combination of set-top boxes 122, televisions 124, other displays, or any other device operable and configured to present linear and/or non-linear (e.g., on-demand) content to a viewer.

A set-top box 122 may be any suitable device configured to connect to a television 124 or other display and an external source of a signal over a distribution network 110. For example, the set-top box 122 may be a cable set-top box, a gateway device, a combination modem and set-top device, a digital satellite set-top box, or an Internet protocol television (IPTV) set-top box operatively configured to communicate with a corresponding network operator system 102 (e.g., a cable network operator, a satellite network operator, an over-the-top IP network content distributor/operator, etc.) over a corresponding distribution network 110 and to convert the received signals into signals capable of displaying audio/video content by a television 124 or other display to a viewer. In one embodiment, the set-top box 122 is adapted to connect to and communicate with a television 124 or other display, as well as to receive command signals from one or more remote control devices 126, which may be a conventional remote control device or any other user device programmed and operable for communicating directly or via an intervening device with the set-top box 122, such as wirelessly (e.g., infrared, Bluetooth, radio frequency, etc.).

The set-top box 122 may be a multipurpose computing device having one or more processors, memories, and input/output (I/O) interfaces in communication. The set-top box 122 may also include a video processor for processing and providing digital and analog audio/video signaling to a television 124 or other viewer devices, an operating system, and a tuner operable for processing audio/video and/or data with the network operator system 102. The set-top box 122 may pass digital and analog audio/video content and/or data to a television 124 that is received from the distribution network 110 via an audio/video and/or data downlink (e.g., an in-band downlink, or an out-of-band downlink, respectively). In addition, the set-top box 122 may pass data (e.g., commerce command selections, etc.) to the network operator system 102 over the distribution network 110 via an up-link. The set-top box 122 may include computer-executable instructions that provide programming to facilitate the display of content, instructions, and special features, and to facilitate the receiving and processing of viewer commands issued via a remote control device 126, for example. Example programming includes, but is not limited to, facilitating the display of advertisement content, overlays, special instructions, and the like, which may be used to present commerce commands and product or service information to the viewer, and facilitating the receipt of a viewer's selections of one or more commerce commands associated with a product or service for transmission to the network operator system 102 via the distribution network 110 (e.g., via an up-link).

In other embodiments, a set-top box 122 may not be provided, such as where another viewer device is used (e.g., a television 124 adapted for direct communication with a distribution network 110, or a personal computer and display adapted for communication over a distribution network 110 such as an IP network). It is appreciated that the aforementioned examples of viewer devices and network adaptability are provided for illustrative purposes only, and that any other distribution network viewer device may be used with the system 100.

In addition, the viewer system 120 may further include one or more mobile devices 128 operable for communication over one or more wireless networks 108. A mobile device 128 may be any device operable for wireless communications and/or for other wireless communication means (e.g., Wi-Fi Internet communications, WiMAX network communications, and the like), such as, but not limited to, a mobile phone, a pager device, a smart phone, a personal audio player, a personal device assistant, a personal computer, a laptop computer, or any other suitable portable device operable for wireless communications. To facilitate communications between a viewer's mobile device 128 and the network operator system 102, the network operator system 102 may store an association between the viewer and the viewer's mobile device 128, such as, but not limited to, a phone number, a unique identifier, or a combination thereof. Similarly, the marketplace system 106 may also store an association between the viewer and the viewer's mobile device 128 (or any other unique viewer identifier also maintained by the network operator system 102), such as, but not limited to, an association between the viewer's marketplace account and a phone number, a unique identifier, or a combination thereof. Further details of example methods for associating viewers' mobile devices 128 with their respective accounts at the network operators and the marketplaces are provided below.

Similarly, the viewer system 120 may further include one or more computers 130 or other network access devices operable to access the Internet 112, such as by broadband, dial-up, wireless, or other communication means. The computer 130 may be utilized to view advertisement content provided by or on behalf of the network operator system 102 over the Internet 112 and/or to complete a commerce command with a marketplace system 106. In one embodiment, advertisement content provided over the Internet 112 may present one or more commerce commands, which a viewer can transmit to initiate a commerce transaction. In another embodiment, advertisement content provided over the Internet 112 may allow accessing over the Internet from the computer 130 the corresponding marketplace system 106, the network operator system 102, and/or any other third-party system offering the product or service associated with the commerce command presented. For example, in one embodiment, the advertisement content displayed over the Internet 112 and viewed by the computer 130 may be for provisioning or requesting additional services associated with the content distribution network 110 (e.g., adding channels, adding set-top boxes, adding Internet capabilities, etc.). The marketplace systems 106, network operator system 102, and/or third-party systems may be configured to recognize viewers (i.e., Internet users) using the computer 130 over the Internet 112 based on stored cookies or certificates, based on IP addresses, based on user login information, and the like.

The network operator system 102 illustrated in FIG. 1 represents any system or systems comprising one or more computers or other processor-based devices for implementing various functions provided by the respective network operator. It is appreciated that a network operator system 102 may represent a multiple-system operator (MSO), or other distribution network operator, and may logically include operations performed in part by the network plant, the head-end, and/or any other component or device of a conventional network operator system. Accordingly, the network operator system 102 may include one or more processor-driven devices, such as, but not limited to, a server computer, a personal computer, and the like. In addition to having one or more processors 140, the network operator system 102 may also further include one or more memories 142, one or more input/output (I/O) interfaces 144, and one or more network interfaces 146. The memory 142 may store data files and various program modules, such as an operating system (OS), a client and/or host module, and a database management system (DBMS) for accessing one or more databases, such as one or more data storage devices 148. The data storage devices 148 may be operative for storing viewer account information, interactive shopping information, billing information, and/or other information accessible by the network operator system 102. The I/O interface(s) 144 may facilitate communication between the processor 140 and various I/O devices, such as a keyboard, mouse, printer, microphone, speaker, monitor, and the like. The network interface(s) 146 may take any of a number of forms, such as, but not limited to, a network interface card, a modem, a wireless network card, and the like. In one embodiment, network interfaces may include network system hardware, software, and/or firmware operable to provide content and other data transmission through the distribution network 110, such as over an in-band and an out-of-band media channel with a viewer device (e.g., a set-top box 122 and/or television 124); the wireless network 108, such as between the text message server 150 and a viewer's mobile device 128; the Internet 112 (or any other public or private network), such as between the interactive shopping server 152 and a marketplace system 106; or over any other data channel.

The network operator system 102 may include a text message server 150, an interactive shopping server 152, and a distribution network server 154. The text message server 150, the interactive shopping server 152, and the distribution network server 154 are represented in FIG. 1 as separate components; however, it is appreciated that these components may represent logical functions implemented by a single physical device or may be provided, at least in part, by one or more separate physical devices. The text message server 150 may include computer-executable instructions providing programming to send and to receive text messages (e.g., short message service (SMS) text messages, etc.) to and from a viewer's mobile device 128 over one or more wireless networks 108, and to initiate the processing associated therewith. The interactive shopping server 152 may include computer-executable instructions providing programming to send and receive messaging with one or more marketplace systems 106, such as over the Internet 112, utilizing a serial or other private circuit, or via any other suitable public or private network. Messaging transmitted between the interactive shopping server 152 and the marketplace systems 106 may be initiated responsive to receiving text message commands from a viewer's mobile device at the text message server 150 over a wireless network 108 or responsive to receiving upstream messaging from a viewer device (e.g., a set-top box 122, etc.) over the distribution network 110. The distribution network server 154 may include computer-executable instructions providing programming for distributing audio/video content (e.g., linear broadcast programming and/or non-linear programming, such as on-demand content) over the distribution network 110 to a viewer system 120 (e.g., to a set-top box 122, etc.), which may be responsive to a viewer's selection or other request therefor. It is appreciated that the distribution network server 154, and/or another component of the network operator system 102, is operable to perform other conventional media content distribution functions not specifically described herein. Moreover, the distribution network server 154 and the network operator system 102 may be configured for distributing media over other distribution networks 110 other than cable networks, such as, but not limited to, a satellite broadcast network or an IP network, according to various example embodiments. Each of the text message server 150, the interactive shopping server 152, and the distribution network server 154 are operable to send and to receive data to and from the data storage device 148 when performing one or more of the respective functions.

In addition, the network operator system 102 can further be operable to provide one or more webpages, web portals, or other network-accessible sites that provide the ability to present advertisement content and/or commerce commands to a viewer over the Internet 112 or coordinate advertisement content and/or commerce commands with a marketplace system 106 or other third-party system for access by a viewer and to initiate and conduct a commerce transaction with the network operator system 102 (e.g., for provisioning services, setting reminders, etc.), or with a marketplace system 106 or other third-party system.

The marketplace system 106 may be associated with any marketplace, such as, but not limited to, an Internet-based marketplace (e.g., an online or web-based retailer) offering the sale of goods or products over the Internet, a traditional bricks and mortar retailer or service provider, a mail-based retailer or service provider, and the like. Accordingly, the marketplace system 106 may be any multipurpose computing device having one or more processors, memories, and I/O interfaces in communication. In one embodiment in which the marketplace system 106 provides an online or web-based marketplace, the marketplace system 106 may include, or otherwise be associated with, one or more web servers providing one or more websites over the Internet 112 or other public or private network. In one embodiment, the marketplace system 106 makes available web applets, application programming interfaces (APIs), or other integration programming to receive commands from the interactive shopping server 152 of the network operator system 102 when initiating a commerce transaction on behalf of a viewer. These web applets, application programming interfaces (APIs), or other integration programming may be universally called by any system, or may be programmed specifically for an integration between a specific network operator system 102 and the marketplace system 106. In addition, the marketplace system 106 may further include one or more data storage devices (e.g., memory, databases, etc.) operable to store consumer information, transaction information, billing information, transaction history, product information, service information, and the like.

The distribution network 110 may include any number of telecommunication and/or data networks, whether public, private, or a combination thereof, including one or more conventional broadband distribution networks, such as a fiber optic network, a telephone network, an existing cable television broadcast network (e.g., fiber network, coaxial network, a hybrid fiber-coaxial network, etc.), a satellite broadcast network, an IP network, and the like, which are operable to support transmission according to various media/content and transmission protocols (e.g., MPEG 2, ISO 13818-1, etc.). The distribution network 110 may support downstream, upstream, and/or bi-directional communications. The Internet 112 may be the public Internet, or may otherwise refer to a local area network, a wide area network, a publicly switched telephone network (PSTN), an intranet, intermediate handheld data transfer devices, and/or any combination thereof and may be wired and/or wireless. The wireless network 108 may be any wireless network protocol operable for wireless communications operating under any cellular or other wireless network protocol (e.g., GSM, CDMA, TDMA, etc.). In addition, the wireless network 108 may provide wireless access to the Internet 112. The wireless network 108, the distribution network 110, and the Internet 112 may also allow for real-time, off-line, and/or batch transactions to be transmitted thereover. Due to network connectivity, various methodologies described herein may be practiced in the context of distributed computing environments. Although the system 100 is shown for simplicity as including one intervening distribution network 110, wireless network 108, and Internet 112, it is to be understood that any other network configuration is possible, which may optionally include a plurality of networks, each with devices such as gateways and routers, for providing connectivity between or among networks.

Although not described or illustrated in detail, each content provider system 104 and each marketplace system 106 may be configured in the same or similar manner as described for the network operator system 102. In addition, the system 100 shown in and described with respect to FIG. 1 is provided by way of example only. Numerous other operating environments, system architectures, and device configurations are possible. Accordingly, embodiments of the invention should not be construed as being limited to any particular operating environment, system architecture, or device configuration.

Operational Overview

Figure 2A:
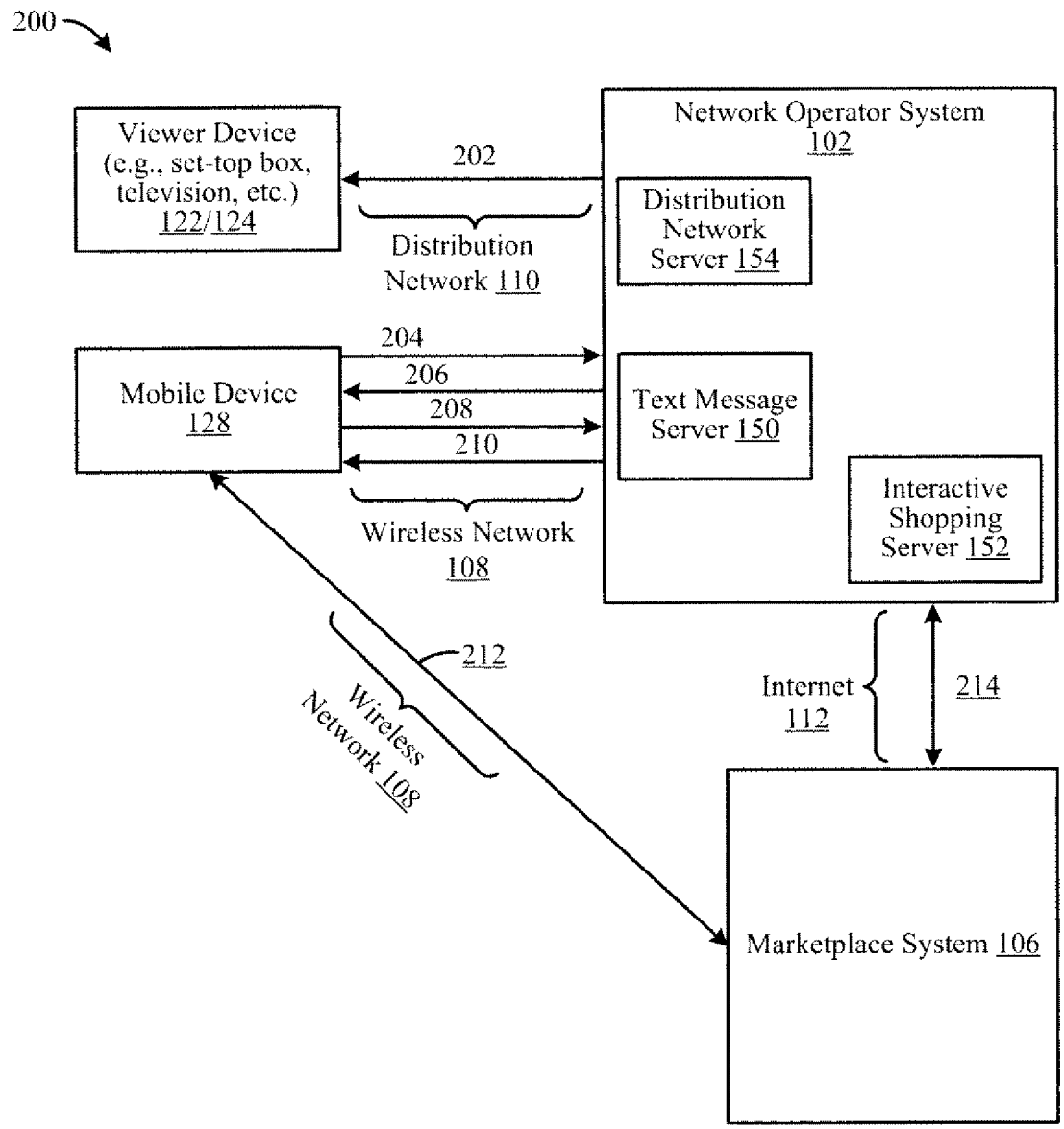
FIGS. 2A-2D illustrate block diagrams depicting example uses of a system and corresponding data flows, according to example embodiments of the invention.
Figure 4A:
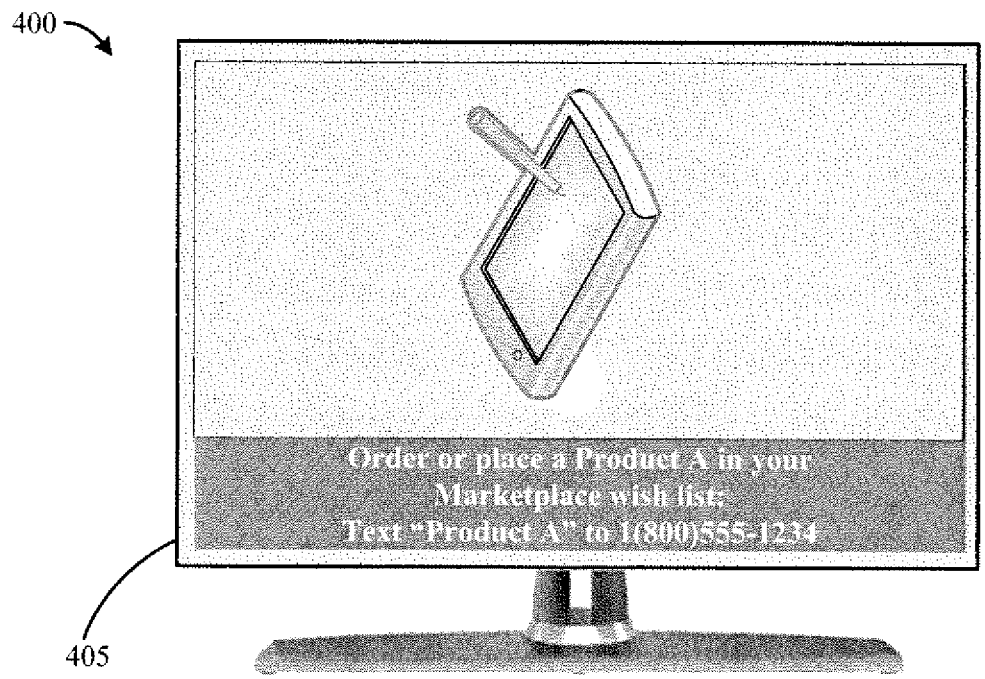
FIGS. 4A-4B are example viewer device displays, according to example embodiments of the invention.

FIGS. 2A-2D illustrate block diagrams 200, 225, 250, 275 representing data flows for facilitating a viewer's commerce transaction over a distribution network, according to example embodiments of the invention. With reference to FIG. 2A, the block diagram 200 indicates an embodiment in which the network operator system 102 provides one or more hyperlinks via a text message to a viewer's mobile device from which the viewer can initiate and/or complete a commerce transaction with a marketplace system 106. In this example embodiment, media content is initially distributed 202 from the network operator system 102 (e.g., via the distribution network server 154) to a viewer device (e.g., a set-top box 122 or a television 124, etc.) over the distribution network 110, as would occur during conventional viewing of audio/visual content over the distribution network. The media content may be conventional media programming, such as linear content or non-linear content (e.g., video on-demand content, etc.). In one embodiment, the media content may include advertisement content, such as an advertisement overlay displayed with viewer-requested (or tuned) content, or a commercial spot broadcast linearly with the media content. In other embodiments, advertisements may be presented to a viewer by means other than over the distribution network (e.g., billboards, paper-based advertising, radio advertising, etc.). The advertisement content can include information for products or services being offered. In addition, the advertisement content can include one or more commerce command options for the viewer, such as, but not limited to, to purchase a product or service; to request information related to a product or service; to add a product or service to a "my favorites" feature, a "wish list" feature, or any other designation for subsequent reference; to request a reminder related to a product or service; or any combination thereof. In this embodiment, the advertisement content may include instructions to text one or more alphanumeric messages to one or more numbers (e.g., "text [PRODUCT/SERVICE NAME/SHORT CODE] to 800-123-4567 to purchase," "text [PRODUCT/SERVICE NAME/SHORT CODE] to 800-123-4568 to add to your wish list," or "text 'Buy [PRODUCT/SERVICE NAME/SHORT CODE]' to 800-123-4567," etc.). FIG. 4A illustrates an example display 405, which includes an advertisement displayed over the distribution network 110, which includes instructions for selecting and transmitting one or more commerce commands. In this embodiment, the instructions may be provided as part of the advertisement content (e.g., by a content provider 104), or it may be provided as an overlay displayed concurrently with advertisement content.

In response to viewing the advertisement content, the viewer may send a first viewer-generated text message 204 (also referred to herein as a "viewer text message") using a mobile device 128 over the wireless network 108 to the network operator system 102 (e.g., to the text message server 150) that includes text corresponding to one or more of the commerce commands indicated by the advertisement content. For example, the viewer may transmit a first viewer text message 204 that includes in the body the description of the product or service desired. The first viewer text message 204 may be addressed to a number associated with a desired commerce command. The network operator system 102 receives and processes the first viewer text message 204 to determine the next steps to be performed to facilitate the viewer's desired commerce transaction. In one embodiment, text messages are at least initially transmitted to the network operator system 102 so the network operator can subsequently control the steps of the transaction, including tracking the transactions for collecting fees for its service. In other embodiments, however, other means may be provided for identifying that a commerce transaction was initiated as a result of a network operator if not initially sent to the network operator system 102. The other means include, but are not limited to, telephone numbers specific to the network-based advertisements, specific alpha-numeric codes that are included in the body of a viewer text message, and the like.

In one embodiment, in response to the viewer text message 204, a network-generated text message 206 may optionally be transmitted from the network operator system 102 over the wireless network 108 to the viewer's mobile device 128 to confirm and/or to provide additional information to the viewer. In response to the network text message 206, a second viewer text message 208 is transmitted from the viewer's mobile device to the network operator system 102 to confirm the commerce transaction, to provide additional details regarding the commerce transaction, and/or to provide additional commerce commands. For example, the body of the second viewer text message 208 may include a confirmation, a viewer's passcode, the selection of a more specific commerce command, the selection of more specific product information (e.g., size, color, quantity, etc.), and the like. This example may be particularly useful if the first viewer text message 204 transmitted is a request for more information, or if the system is programmed to require confirmation by a viewer before initiating a transaction, such as for security purposes to confirm the identity of the viewer. In other embodiments, however, the first network text message 206 and the second viewer text message 208 thereto may not be transmitted; instead, the operations may proceed to send a hyperlink to a marketplace webpage in a text message 210 to the viewer's mobile device 128 after the first viewer text message 204 is transmitted.

After receiving the second viewer text message 208, if transmitted, the network operator system 102 proceeds to generate and transmit another network text message 210 to the viewer's mobile device that contains one or more hyperlinks with underlying URLs to one or more marketplace webpages corresponding to the transaction requested by the viewer. Upon receiving this second network text message 210, the viewer can select the hyperlink (e.g., by clicking using an interface of a web-enabled mobile device, or by using a second web-enabled computer system, etc.) to initiate a session 212 over the Internet 112 via a wireless network 108 with the corresponding marketplace webpage to permit the viewer to initiate and/or to complete the desired commerce transaction.

In one example embodiment, upon receiving the viewer's final commerce command via at least the first or second viewer text message 204, 208, the network operator system 102, such as via the interactive shopping server 152, may generate and transmit messaging 214 with the marketplace system 106 to at least initiate the viewer's desired commerce transaction. For example, the network operator system 102 may transmit messaging 214 to initiate a purchase transaction on behalf of the viewer, which may result in the product or service being placed in the viewer's "purchased items" list, "shopping cart" list, or "checkout" screen, or the network operator system 102 may transmit messaging 214 to add the product or service to a viewer's "favorites" list. Any other commerce commands may be processed in a similar manner. According to one embodiment, the network operator system 102, such as in a data storage device 148, may store an association between the viewer, the viewer's mobile device number (or other identifier), and/or the viewer's marketplace account identifier (or other marketplace identifier, such as username, email address, etc.). Thus, when transmitting the messaging 214 to the marketplace system 106, the messaging 214 may identify the viewer so the marketplace operations can initiate the desired commerce transaction processing on behalf of the viewer, and so the viewer can, upon navigating to the marketplace website and logging in, immediately review and complete the commerce transaction.

Though, in other embodiments, the network operator system 102 may not transmit messaging 214 to initiate the commerce transaction. Instead, the network operator system 102 may configure the URL underlying the hyperlink transmitted as part of the final network text message 210 to enable navigation to the most relevant webpage of the marketplace website (e.g., navigate to the product or service webpage, navigate to a request for information page, etc.).

Accordingly, upon the viewer initiating the session 212 with the marketplace webpage, the viewer can complete the desired transaction. According to one embodiment, the hyperlink provided by the network operator system 102 in the final network text message 210 may include identifying information (or other characteristics) that permit the marketplace system 106 to determine that the commerce transaction is initiated as a direct result of the network operator system 102 operations. By accrediting the network operator system 102 with enabling the viewer to conduct the commerce transaction, the network operator system 102 may collect fees or attain any other benefit that may be arranged between the marketplace and the network operator for facilitating the commerce transaction. Thus, the more the network operator system 102 is able to direct commerce transactions with marketplaces by its viewers, the more pecuniary (or other) benefits the network operator may realize. Additional messaging between the marketplace system 106 and the network operator system may be provided for logging, tracking, and accounting for transactions initiated and/or completed as a result of the network operator system's 102 facilitation.

Figure 2B:
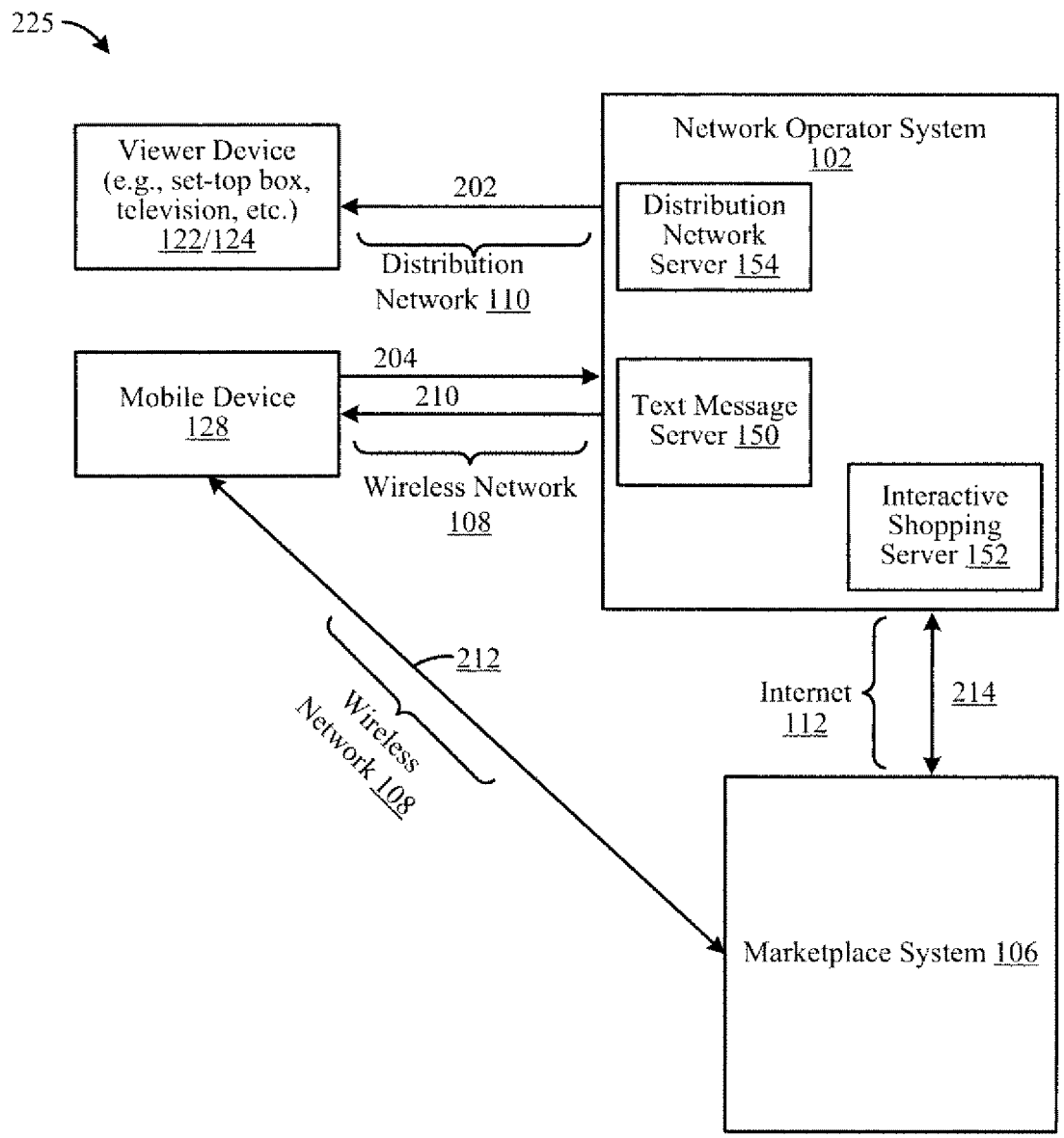

The block diagram 225 of FIG. 2B illustrates the example embodiment in which only a single viewer text message 204 and network text message 210 response are exchanged between the network operator system 102 and the viewer's mobile device 128 to facilitate the viewer to initiate and complete a commerce transaction with a marketplace system 106. According to this embodiment, after viewing the media content 202, and at least some advertisement content, as described above with reference to FIG. 2A, the viewer generates and transmits a viewer text message 204 using a mobile device 128 over a wireless network 108. The viewer text message 204 identifies one or more products or services and indicates one or more commerce commands desired by the viewer, also as described with reference to FIG. 2A. In response, the network operator system 102 can optionally generate and transmit messaging 214 with the marketplace system 106 to initiate the commerce transaction indicated by the viewer text message 204. The network operator system 102 then also transmits at least one network text message 210 to the viewer's mobile device 128 over the wireless network 108 wireless network 108 wireless network 108 that contains at least one hyperlink to enable the viewer to begin a website session 212 with the marketplace to complete the commerce transaction.

Figure 2C:
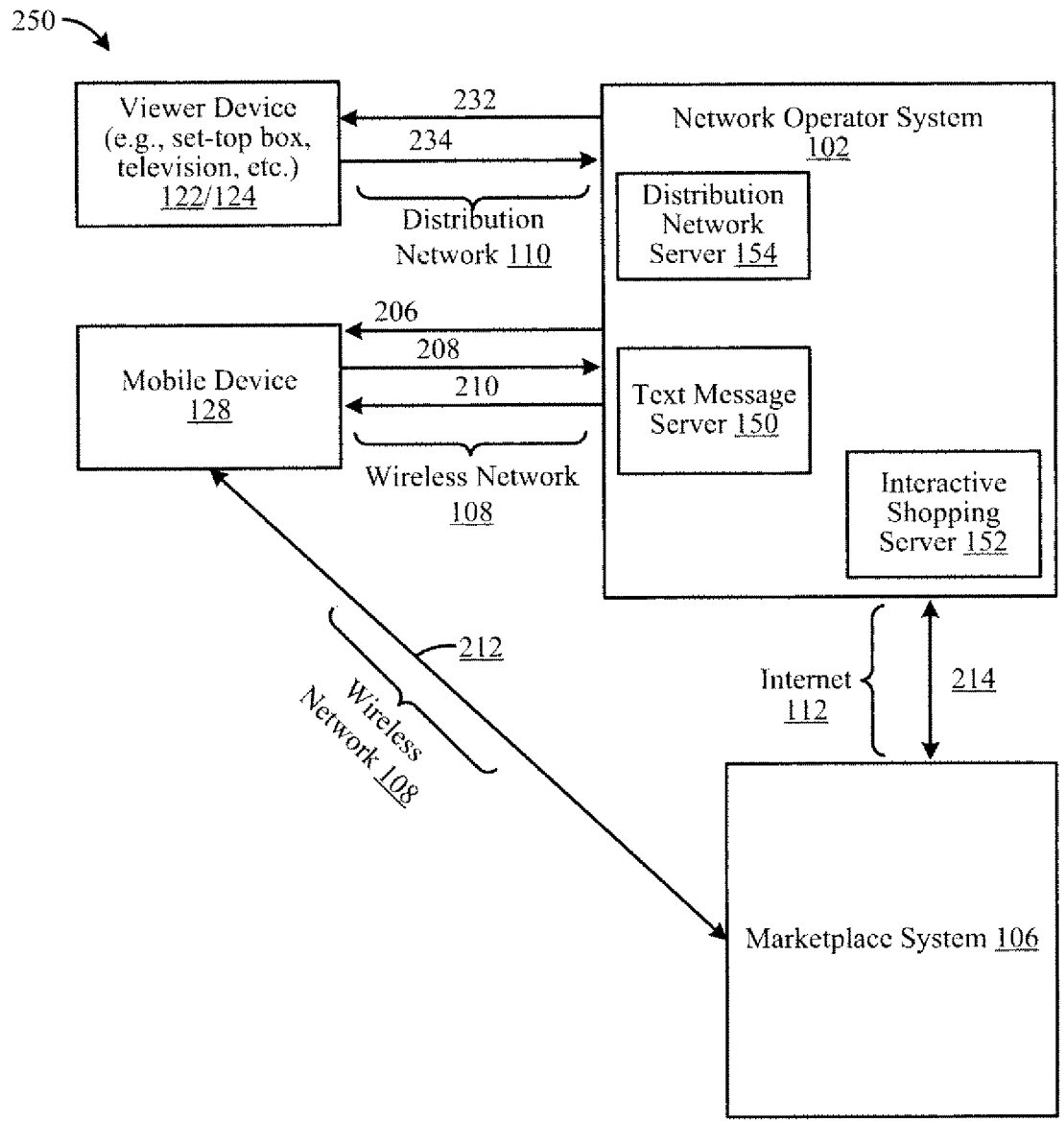
Figure 4B:
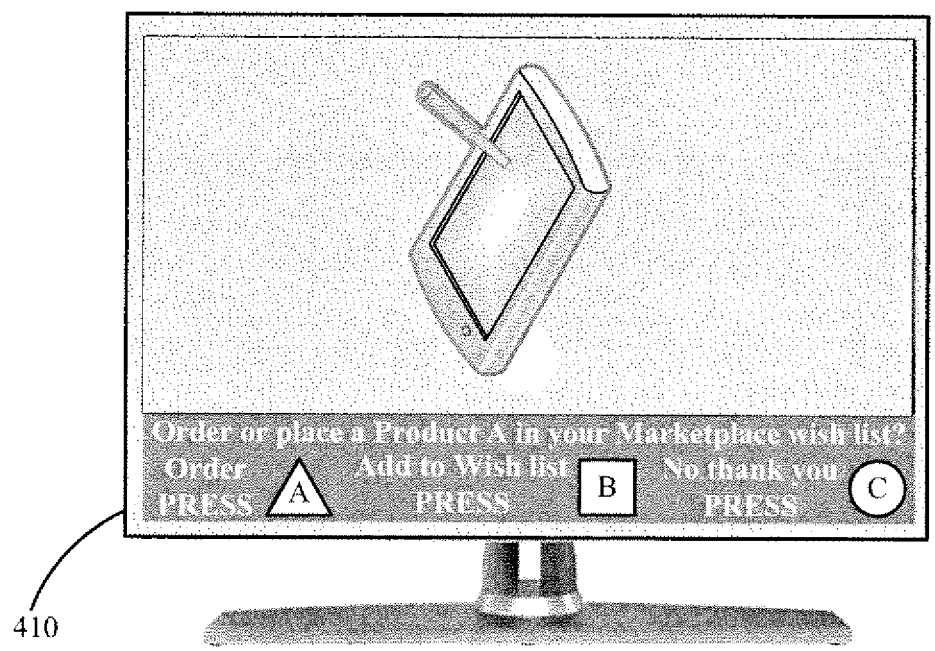

The block diagram 250 of FIG. 2C illustrates a different embodiment in which the viewer provides a selection of one or more commerce commands via upstream messaging over the distribution network instead of via text messaging described in the examples illustrated by FIGS. 2A-2B. According to this embodiment, the network operator system 102 transmits media content 232 that includes special programming that enables the selection of one or more commerce commands by a viewer. The programming may be added to the content stream, such as by one or more APIs (e.g., enhanced TV binary interchange format (EBIF), etc.) that the viewer device (e.g., the set-top box 122) is programmed to process. For example, according to this embodiment, the network operator system 102 (e.g., the distribution network server) may combine the content stream with an overlay that presents product or service information (like an advertisement) and corresponding commerce commands via the viewer device after being processed thereby. In response to viewing the overlay, the viewer may indicate a desired response using a remote control device 126 interacting with the viewer device. Any number of means for presenting options to a viewer and allowing selection thereof may be provided, such as, but not limited to, menu presentation, graphic presentation, textual presentation, and the like. For example, in one embodiment, the overlay may accompany (or provide) an advertisement of the product or service and present options associated with each available commerce command (e.g., "Buy," "Favorites," "Wish List," "More Information," "Reminder," etc.). Using navigation features on the remote control device 126 (e.g., navigate the on-screen menu to highlight the desired selection or enter a number/letter, etc., corresponding to the desired selection), the viewer can select a commerce command. Upon selection, the viewer device (e.g., programming in the set-top box 122 or the television 124) will process the viewer's selection and transmit one or more upstream messages 234 (e.g., using EBIF protocol, etc.) over the distribution network 110 to the network operator system 102 to indicate the viewer's selected commerce command. FIG. 4B illustrates an example display 410, which includes an advertisement and an overlay with instructions for selecting one or more commerce commands presented by a menu (e.g., selecting "A", "B", or "C" with a remote control device 126).

In response to receiving the upstream message 234, the network operator system 102 may process the upstream message, such as by programming provided by the distribution network server 154, to identify the viewer's desired product or service and the corresponding commerce command or commands. Once identified, the network operator system 102 may proceed as described with reference to FIG. 2A or 2B. For example, in the embodiment illustrated in FIG. 2C, after receiving and processing the upstream message 234, the network operator system 102 generates and transmits a network text message 206 over a wireless network 108 to the viewer's mobile device 128 to confirm and/or to provide additional information to the viewer. In response, a second viewer text message 208 is transmitted from the viewer's mobile device 128 to the network operator system 102 to confirm and/or provide additional details regarding the commerce transaction, as described with reference to FIG. 2A.

In this embodiment, after receiving the second viewer text message 208, the network operator system 102 can optionally generate and transmit messaging 214 with the marketplace system 106 to initiate the commerce transaction indicated by the upstream message 234 and/or the second viewer text message 208. The network operator system 102 then also transmits at least one network text message 210 to the viewer's mobile device 128 over the wireless network 108 that contains at least one hyperlink to enable the viewer to begin a website session 212 with the marketplace to complete the commerce transaction, also as described with reference to FIGS. 2A-2B. Upon receiving this network text message 210, the viewer can select (e.g., by clicking using an interface of a web-enabled mobile device, or by using a second web-enabled computer system, etc.) the hyperlink transmitted to initiate a session 212 over the Internet 112 via a 108 wireless network 108 with the corresponding marketplace webpage to permit the viewer to initiate and/or to complete the desired commerce transaction.

Figure 2D:
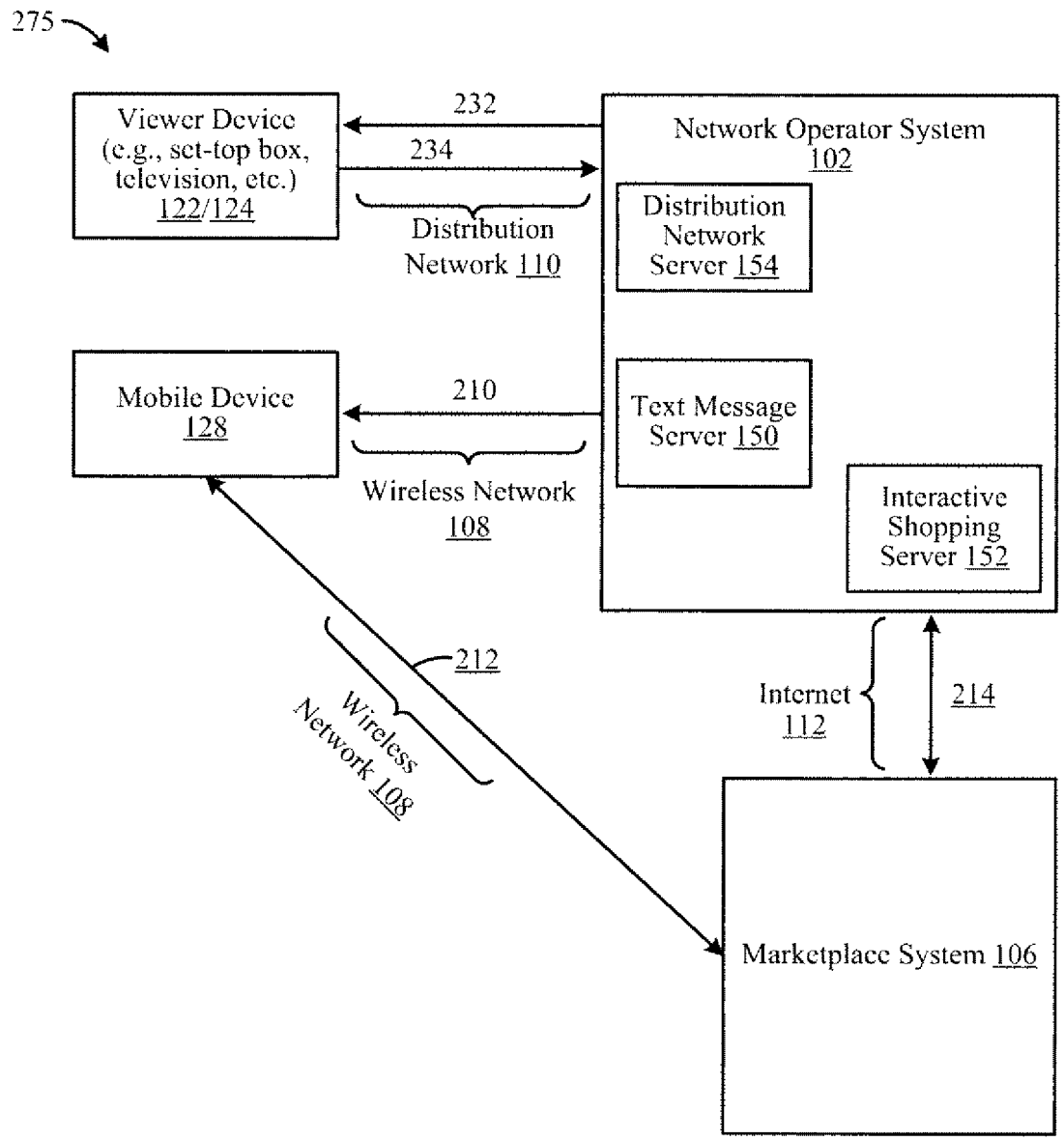

Otherwise, in the embodiment illustrated by the block diagram 275 of FIG. 2D, after transmitting the upstream message 234, the network operator system 102 only transmits a single network text message 210 response to the viewer's mobile device 128 to facilitate the viewer to initiate and complete a commerce transaction with a marketplace system 106, similar to that described with reference to FIG. 2B. According to this embodiment, the upstream message 234 identifies one or more products or services and indicates one or more commerce commands desired by the viewer. In response, the network operator system 102 can optionally generate and transmit messaging 214 with the marketplace system 106 to initiate the commerce transaction indicated by the upstream message 234. The network operator system 102 then also transmits at least one network text message 210 to the viewer's mobile device 128 over the wireless network 108 that contains at least one hyperlink to enable the viewer to begin a website session 212 with the marketplace to complete the commerce transaction.

Accordingly, as indicated by the example block diagrams 200, 225, 250, 275 of FIGS. 2A-2D, respectively, a viewer may communicate with a network operator system 102 using text messaging over a wireless network or using upstream messaging from a viewer device (e.g., set-top box 122) over the distribution network 110. In response, the network operator system 102 may proceed to initiate the commerce transaction with a marketplace system on behalf of the viewer, or provide, via a hyperlink, means for the viewer to access the marketplace system website for initiation and/or completion of the commerce transaction. The amount of transaction processing conducted by the network operator system 102 with the marketplace system 106 on behalf of the viewer can vary, as desired. In some embodiments, there may be significant value realized (e.g., likelihood of completing a sale, etc.) by limiting the amount of transaction steps required by the viewer. Thus, the network operator system 102 may desire to perform more processing and simply provide a single hyperlink or other means for confirmation of the transaction by the viewer that, when selected, would complete the commerce transaction with little additional effort on the part of the viewer. Though, in other circumstances, it may be that the cost of additional processing required by the network operator system 102 with the marketplace system 106 outweighs any benefit accrued by an increase in transaction completion rates, such as if the integration is too difficult or costly, or if it causes too much processing overhead, etc. Thus, in these circumstances, it may be that only minimal transaction messaging is performed between the network operator system 102 and the marketplace system 106, such as by only performing post-transaction logging/accounting, or by only identifying the viewer, product, etc., and requiring the viewer to perform additional operations to complete the transaction directly with the marketplace system 106 over a website, etc.

It is appreciated that the above-described data flows are provided for illustrative purposes, are not intended to be limiting, and that other operations may be performed to facilitate a commerce transaction for or on behalf of a viewer. For example, in one variation, a viewer may contact a marketplace over a voice call and provide it with one or more codes or other unique identifiers provided by the network operator system 102 to complete the transaction as desired. In another variation, the viewer may not access the marketplace system 106 using the mobile device 128 on which a network text message was received from the network operator system 102. Instead another device may be used (e.g., a personal computer, a different mobile device, an IP television, etc.). Moreover, in one embodiment, the network operator system 102 may not provide a network text message to a viewer's mobile device 128 to complete the transaction. Instead, the network operator system 102 may have previously arranged for permission, account access, and/or payment information to allow the network operator system 102 to complete the transaction entirely on behalf of the viewer upon the viewer's initial request with commerce commands. Additional variations will be apparent in light of the following flow diagrams describing in detail example operations.

Figure 3A:
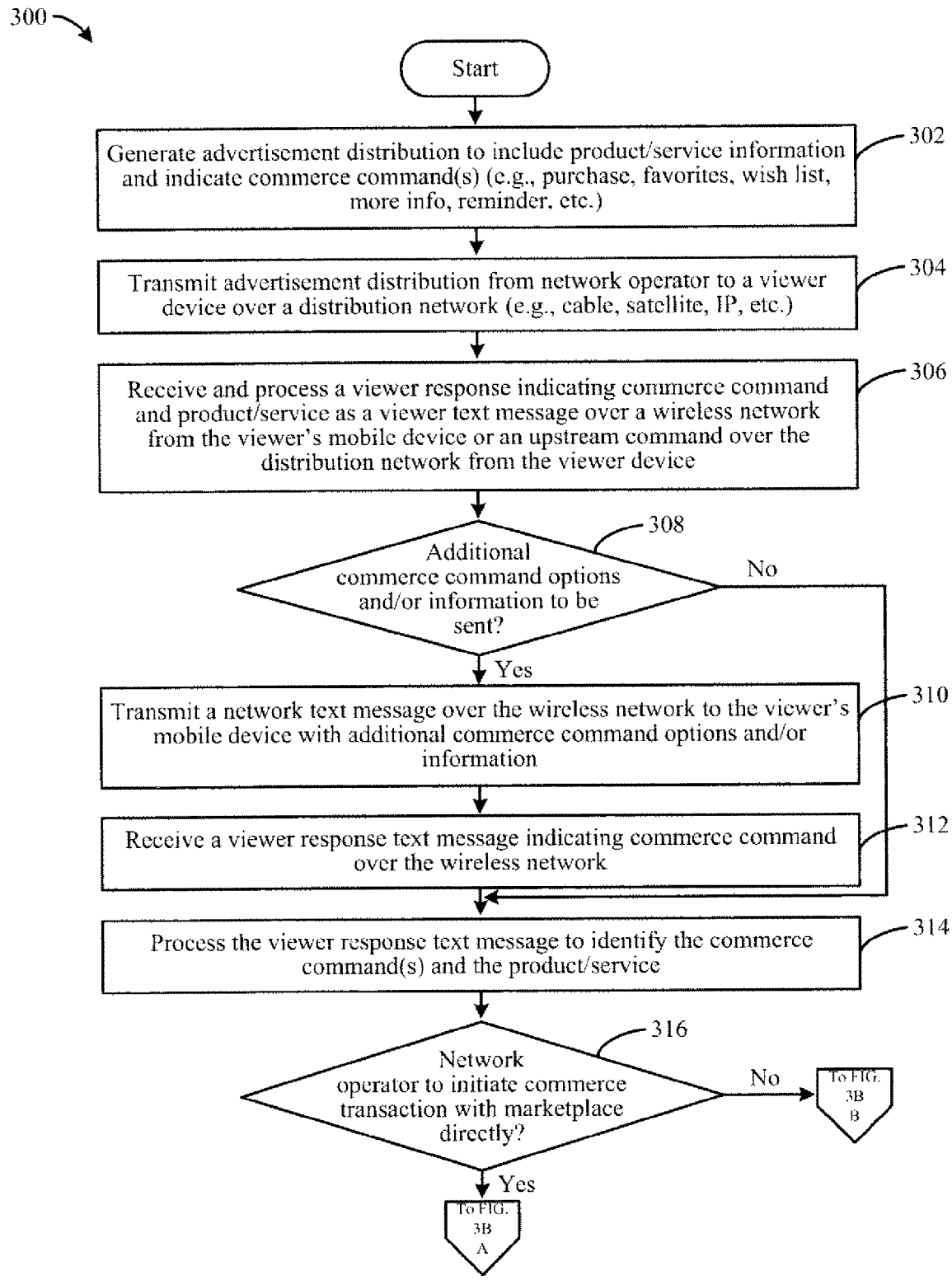
FIGS. 3A-3C are flow diagrams of an example method for facilitating a commerce transaction, according to an example embodiment of the invention.
Figure 3B:
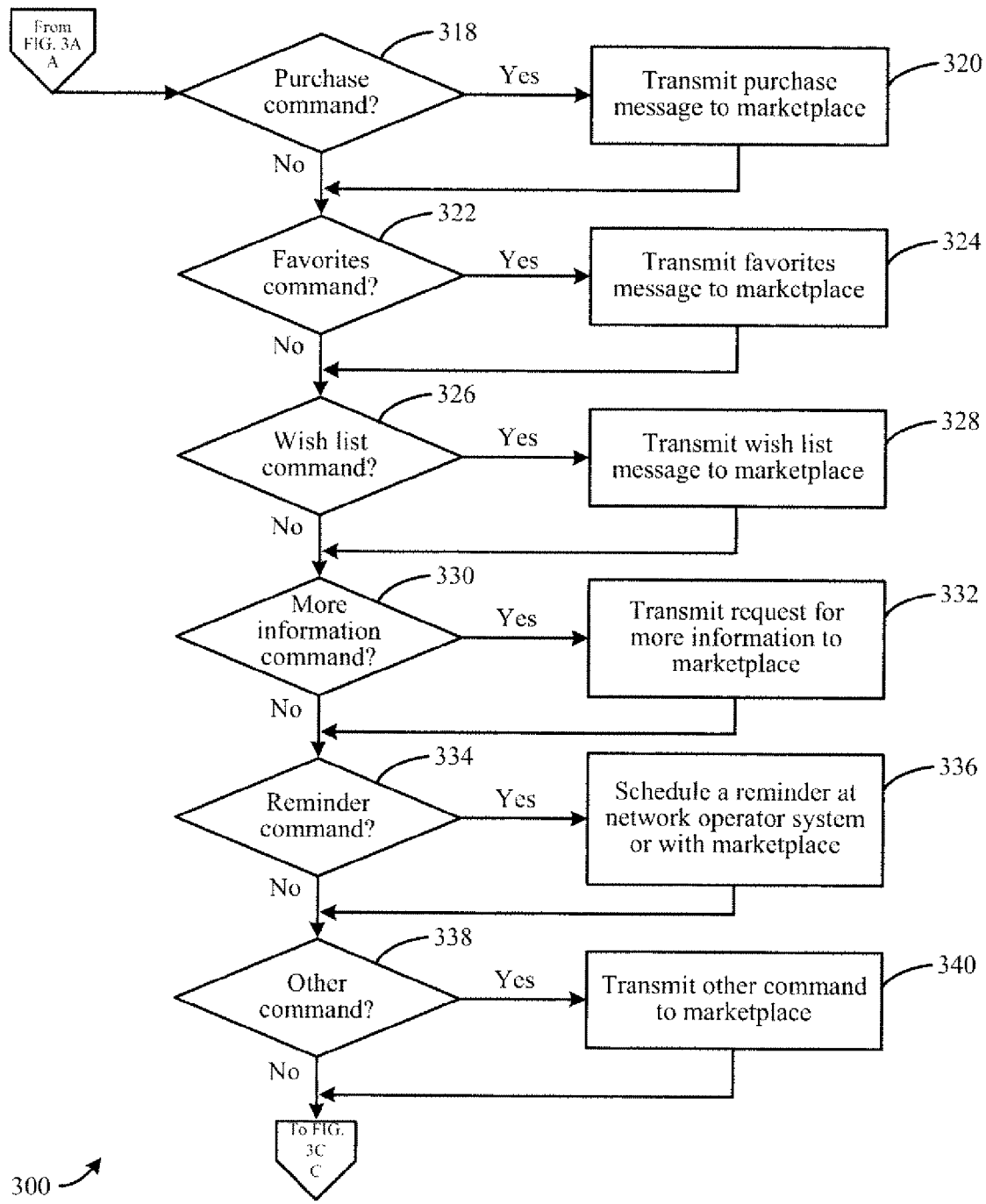
Figure 3C:
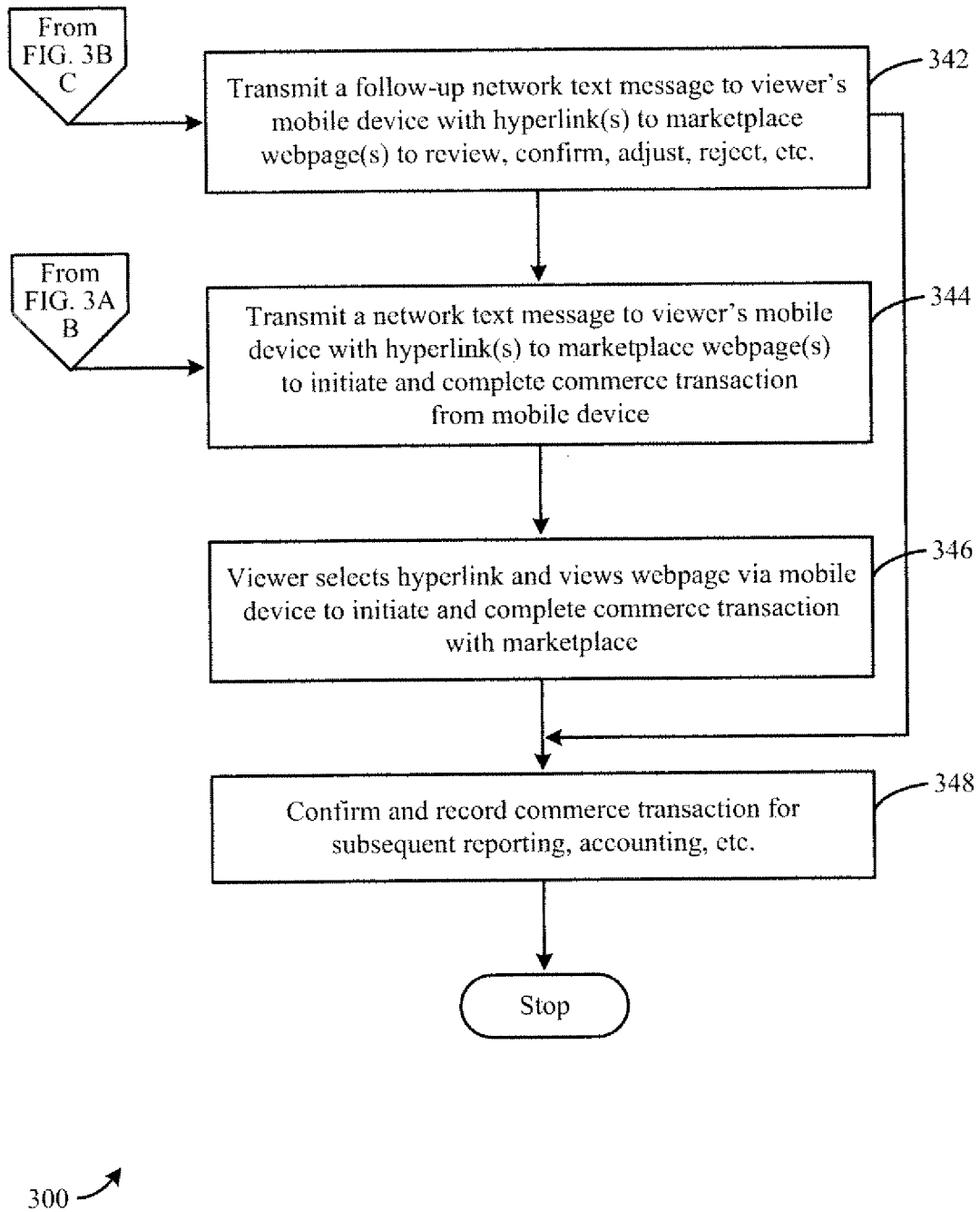

FIGS. 3A-3C represent flow diagrams of an example method 300 for facilitating a viewer to conduct a commerce transaction at least in part over a distribution network, according to one embodiment. The operations of the method 300 reflect the various data flows illustrated by example in FIGS. 2A-2D. According to one embodiment, the operations of the method 300 may be performed at least in part by a network operator system, such as the network operator system 102 described with reference to FIG. 1, and various servers or modules associated therewith, such as the distribution network server 154, the interactive shopping server 152, and the text message server 150.

The method 300 may begin at block 302, in which advertisement content is generated to describe a product or service offered, as well as to include instructions to a viewer on how to purchase the product or conduct any other commerce transaction as described above (e.g., a purchase transaction, a "my favorites" transaction, a "wish list" transaction, a request for more information, a request for a reminder, etc.). These actions or transactions may be referred to herein generally as "commerce commands" or "commerce transactions," and may include any number of transaction types desired.

According to one embodiment, the advertisement content is for broadcasting over a distribution network, such as the distribution network 110 described with reference to FIG. 1. Advertisement content may include, but is not limited to, a traditional commercial or other advertisement segment broadcast linearly with regular broadcast programming, an advertisement overlay broadcast for display "on top of" or concurrently with regular broadcast programming (e.g., an overlay accompanying a commercial for the product or service or an overlay accompanying other programming), or it may be an on-demand asset stored at, or otherwise associated with, the network operator and accessible in non-linear fashion. Moreover, in other embodiments, the advertisement content may be presented to a viewer by means other than over the distribution network 110, such as, but not limited to, paper-based advertising (e.g., magazines, newspapers, fliers, mailers, etc.); billboard, sign, or poster advertising; radio advertising; electronic advertising (e.g., email, Internet, wireless, cellular, etc.); and the like. Regardless of its method of presentation, the advertisement content is intended to describe to consumers a unique means to purchase a product (or conduct any other commerce transaction) that is facilitated by the network operator system 102, either by exchanging text messages over a wireless network and/or by sending upstream messages over a distribution network, such as is described above with reference to FIGS. 2A-2D.

Following block 302 is block 304, in which advertisement content is transmitted over the distribution network 110 to a viewer device, such as, but not limited to, a set-top box 122 or a television 124, according to one embodiment. The advertisement content may be transmitted as part of linear broadcasting or non-linear broadcasting (e.g., responsive to a request for an on-demand asset). The advertisement content describes a product or service and gives instructions to a viewer on how to purchase the product or conduct any other commerce transaction. For example, as described above with reference to FIG. 2A, in one embodiment, the advertisement content can include instructions on how to generate a viewer text message indicating one or more commerce commands. In another embodiment, the advertisement content can include a menu or other selection means that a viewer can select by interacting with the viewer device (e.g., using a remote control device 126), such as may be generated via an advertisement overlay. Moreover, as described above, in other embodiments, block 304 need not be performed if advertisement content is not transmitted over the distribution network 110, but presented via another traditional advertising channel.

Block 306 follows block 304. At block 306, the viewer indicates the desired commerce command or commands. In one embodiment, the viewer indicates the desired commerce command or commands via a viewer text message sent from the viewer's mobile device 128 over the wireless network 108 to the network operator system 102, such as is described with reference to FIGS. 2A-2B. For example, the body of the text message may identify the product, the commerce command, or both, and the text message may be addressed to a particular number associated with the offer provided via the advertisement content. FIG. 4A illustrates an example display 405 to which a viewer would respond in this embodiment.

In another embodiment, the viewer indicates the desired commerce command or commands via an upstream message transmitted from the viewer device (e.g., a set-top box 122) over the distribution network 110 to the network operator system 102, such as is described with reference to FIGS. 2C-2D. For example, the viewer may use a remote control device 126 to navigate a menu or options displayed with the advertisement content to select the desired commerce command. In response, the viewer device processes the viewer selection (e.g., using programming instructions contained thereon) to generate and transmit one or more upstream messages (e.g., an EBIF message, etc.) indicating the viewer's selection. Additional details of each of these embodiments are described with reference to FIGS. 2A-2D.

Accordingly, the network operator system 102 receives the viewer's selected commerce command or commands (e.g., via the text message server 150 if a text message is sent over the wireless network 108 or via the distribution network server 154 if an upstream message is transmitted over the distribution network 110). Upon receipt of the viewer's selected commerce command, the network operator system 102 processes the message to determine the associated product, to determine the desired commerce command or commands, and to identify the viewer. The network operator system 102 may include one or more tables or other stored information, such as in a data storage device 148, to facilitate making these determinations. For example, stored information may include, but is not limited to, product/service identifiers, product/service names, product/service descriptions, product/service prices, marketplace identifiers, marketplace names, marketplace information, marketplace contact information (e.g., website addresses, web applet identifiers, etc.), marketplace agreements, viewer identifiers (e.g., distribution network account number, marketplace account number, mobile device number, mobile device identifier, wireless service provider identifier, set-top box identifier, username, password, email address, etc.), viewer information, viewer agreements, viewer permissions, commerce commands, telephone numbers (or other termination identifiers, which may be used to uniquely identify products, commerce commands, etc., depending upon which number a viewer text message is received, etc.), and the like. Thus, the network operator system 102 can use any combination of the aforementioned information (or any other information needed) to process the received selection of commerce commands for identifying the product or service, the selected commerce command, and the viewer transmitting the message.

As part of the processing, it may be determined whether one or more additional messages are to be transmitted to the viewer at decision block 308. For example, in certain data flows, the network operator system 102 may send additional messaging to the viewer, such as, but not limited to, for confirmation of the transaction, to present additional commerce command options, to receive additional viewer information, to receive additional product or service information, and the like. Example data flows associated with exchanging additional messages are described with reference to messages 206, 208 of FIGS. 2A and 2C. Whether additional messaging is to be transmitted to the viewer may, in some embodiments, depend upon an arrangement with the marketplace (e.g., if the marketplace requires confirmation from the viewer, if the marketplace requires the viewer to complete the transaction personally, etc.), the agreement or permissions provided by the viewer (e.g., the viewer requires confirmation for any initiated transactions, etc.), the number of options associated with the commerce transaction that are available, the complexity of the programming, and the like.

If it is determined at decision block 308 that additional messaging is to be transmitted to the viewer, then blocks 310-312 follow. Otherwise, operations continue to block 314. At block 310, one or more additional messages are transmitted from the network operator system 102 to the viewer. In the embodiment illustrated in FIG. 3A, the messages are embodied as network text messages transmitted over the wireless network 108 to the viewer's mobile device 128. However, in other embodiments, the messages may be transmitted via the distribution network 110 by downstream and/or upstream messages exchanged with the viewer device (e.g., the set-top box 122), or over the Internet 112 (e.g., via email or a webpage). The content of the additional network messages may vary as desired.

If a response to the message transmitted at block 310 is required, the viewer may respond to the additional network message at block 312. For example, in one embodiment, the viewer's response transmitted at block 312 may indicate confirmation of the transaction by the viewer. In another embodiment, the viewer's response may indicate a more specific selection of a commerce command or the selection of an additional commerce command than what was indicated by the viewer's initial selection at block 306. In yet another embodiment, the viewer's response may indicate additional details regarding the commerce transaction, such as, but not limited to, quantity desired, size desired, color desired, transaction timing, and the like. Again, in one embodiment, the response may be via a viewer text message transmitted to the network operator system 102 over the wireless network; though, in other embodiments, other messaging over other networks may be used.

Following block 312 is block 314. At block 314, upon receipt of the viewer's response at block 312, or after determining that no additional messaging was required at decision block 308, the network operator system 102 processes the message to determine the content of the viewer's response and the impact it has on the transaction, in a manner similar to that described with reference to block 306. Based on the processing (and the viewer's selection), the network operator system 102 may initiate or complete the commerce transaction with the marketplace, modify the commerce transaction parameters, or cancel the commerce transaction (e.g., if requested by the viewer or if no response is received). The following blocks describe in detail various example operations for processing the commerce transaction with the marketplace.

Following block 314 is decision block 316, in which it is determined whether the network operator system 102 is to initiate and/or complete the commerce transaction with the marketplace system 106 directly on behalf of the viewer, or if the network operator system 102 is merely to provide information to the viewer to enable the viewer to complete the desired commerce transaction. As described above with reference to FIGS. 2A-2D, in one embodiment, the network operator system 102 may at least initiate, if not complete, the commerce transaction directly with the marketplace system 106 on behalf of the viewer. In another embodiment, the network operator system 102 may only perform minimal processing directly with the marketplace system 106 (or none at all), and instead transmit additional messaging (e.g., hyperlinks, applets, etc.) to the viewer for initiating and/or completing the transaction directly with the marketplace system 106. It is appreciated that, in some embodiments, a combination of these two approaches may be implemented, such that the network operator system 102 begins the transaction with the marketplace system 106, but then transmits information to the viewer for the viewer to complete the transaction directly with the marketplace system 106.

If it is determined at decision block 316 that the network operator system 102 is to at least begin the commerce transaction with the marketplace system 106, then blocks 318-342 are performed. At blocks 318-342, the network operator system 102, such as via the interactive shopping server 152, exchanges messages with the marketplace system 106 to begin the commerce transaction. Otherwise, if it is determined at decision block 316 that the network operator system 102 is to permit the viewer to initiate and/or complete the commerce transaction directly with the marketplace system 106, operations continue to block 344.

For the operations by which the network operator system 102 at least initiates commerce transaction processing directly with the marketplace system 106, at decision block 318, it is determined, based on processing the received viewer's selection, whether the commerce command is a purchase command. If so, then block 320 follows, in which the network operator system 102 exchanges one or more messages with the marketplace system 106 to initiate a purchase command. The messaging generated by the network operator system 102 may use an existing integration interface, such as, but not limited to, web applets or APIs, made available by the marketplace system. Thus, if using existing integration interfaces, the content and structure of the messaging may be dictated by the existing integration interfaces. Otherwise, integration messaging unique to this implementation may be provided for integration between the network operator system 102 and the marketplace system 106. Furthermore, it is appreciated that messaging format and/or content may differ for different marketplace systems 106 and/or different network operator systems 102. Example content provided in the messaging at block 320 may include, but is not limited to, an identification of the viewer (e.g., a network account number, a telephone number, a marketplace account number, an email address, a username, etc.), payment information (e.g., credit card number, etc.), billing address information, shipping address information, an identification of the product or service (e.g., name, unique identifier, SKU, etc.), an identification of the offer (e.g., a unique campaign or advertisement identifier, etc.), and the desired commerce command or commands (e.g., "purchase" or "place in shopping cart" in this instance). The messaging may be transmitted over a secure connection and/or as an encrypted or otherwise secured message to protect the content.

In one embodiment, a purchase transaction may mean that the network operator system 102 is to initiate and complete the purchase transaction on behalf of the viewer. This may occur, for example, if the network operator system 102 has obtained permission from the viewer to complete the transaction, which may be specific to the instant commerce transaction or may be a broader permission provided by the viewer for more than the instant transaction. A purchase transaction may be completed utilizing payment, billing, and shipping information maintained by the marketplace system 106 for the viewer (e.g., if the viewer already has an account with the marketplace system), or utilizing payment, billing, and shipping information provided by the network operator system 102.

In another embodiment, a purchase transaction may be conducted by the network operator system 102 by instructing the marketplace system 106 to place the product or service in the viewer's "shopping cart" or any other suitable association that indicates that the selected product or service is ready for completion of the purchase transaction. In this embodiment, the viewer may subsequently access the marketplace system 106 (e.g., via a website, telephone, in-person, etc.) to complete the purchase transaction.

According to various embodiments, for any commerce transaction, the marketplace system 106 may store one or more unique identifiers in association with a viewer's marketplace account to enable identification of the viewer from the messaging received from the network operator system 102. For example, the marketplace system 106 may store a telephone number, an email address, an account number, or any other unique identifier that is known by both the marketplace and the network operator. In other embodiments, the network operator system 102 may instead, or additionally, store an identifier already maintained by the marketplace system 106, such as a marketplace account, username, email address, and the like, for inclusion in messaging transmitted by the network operator system 102 to the marketplace system 106 to identify the viewer.

After blocks 318-320, decision block 322 follows, in which it is determined, based on processing the received viewer's selection, whether the commerce command is a favorites command. If so, then block 324 follows, in which the network operator system 102 exchanges one or more messages with the marketplace system 106 to initiate the favorites command. According to one embodiment, a favorites command may allow placing the advertised product or service in a favorites list associated with the viewer. A favorites list would allow the viewer to subsequently recall the favorites list, while also enabling the marketplace system 106 to personalize marketing based on the viewer's expressly indicated favorites. In one embodiment, instead of, or in addition to, exchanging messaging with the marketplace system 106 at block 324, the network operator system 102 may create and store a favorites association between viewer and the product or service, such as in the data storage device 148. A favorites list maintained by the network operator system 102 may likewise allow the network operator system 102 to personalize advertising, marketing, or other media broadcast functions based on the viewer's expressly indicated favorites.

After blocks 322-324, decision block 326 follows, in which it is determined, based on processing the received viewer's selection, whether the commerce command is a wish list command. If so, then block 328 follows, in which the network operator system 102 exchanges one or more messages with the marketplace system 106 to initiate the wish list command. A wish list commerce command may be processed in the same or similar manner as the favorites commerce command, described with reference to blocks 322-324. In one embodiment, a wish list may be used by the marketplace system 106 to permit the viewer and/or other system users to subsequently identify products or services expressly indicated by the viewer as desired. Like the favorites list, the wish list may further be used to personalize advertising and other marketing by the marketplace system 106 and, optionally, the network operator system 102 if it maintains a wish list.

After blocks 326-328, decision block 330 follows, in which it is determined, based on processing the received viewer's selection, whether the commerce command is a request for more information. If so, then block 332 follows, in which the network operator system 102 exchanges one or more messages with the marketplace system 106 to initiate the request for more information regarding the product or service advertised. According to one embodiment, the marketplace system 106 may respond to the request for more information directly with the viewer (e.g., text message, email, written correspondence, telephone call, etc.). In another embodiment, the marketplace system 106 may respond to the network operator system 102 with the requested additional information, thus enabling the network operator system 102 to provide the additional information requested to the viewer (e.g., over the wireless network 108, the Internet 112, and/or over the distribution network 110, etc.). In yet another embodiment, instead of exchanging messages with the marketplace system 106 at block 332, the network operator system 102 may retrieve locally stored, or otherwise accessible, product or service information and transmit the additional requested information to the viewer (e.g., over the wireless network 108, the Internet 112, and/or over the distribution network 110, etc.).

After blocks 330-332, decision block 334 follows, in which it is determined, based on processing the received viewer's selection, whether the commerce command is a request for a reminder. If so, then block 336 follows, in which the network operator system 102 schedules a reminder internally and/or with the marketplace system 106. A reminder may be used for any number of purposes. For example, in one embodiment, a reminder commerce command transmitted from a viewer may include a date and/or time to initiate the reminder. In other embodiments, the reminder may simply be another list of items identified as reminders, or may include a default reminder time. In one example, at the time of the reminder, it is expected that at least information about or otherwise identifying the advertised product or service is presented to the viewer. In one embodiment, the reminder may be sent by the network operator system 102 by a network text message over the wireless network 108. In another embodiment, the reminder may be transmitted by the network operator system 102 over the distribution network 110, such as to the viewer's set-top box 122, for display either at the time transmitted or at a later time. For example, the reminder may be scheduled by the network operator system 102 and sent at a predetermined time for immediate display to the viewer, or the reminder may be sent by the network operator system 102 to the viewer device, which will subsequently process the reminder to determine the time to display to the viewer. In yet another embodiment, the network operator system 102 may exchange messages with the marketplace system 106 in the same or similar manner as described for the other commerce commands, enabling the marketplace system 106 to transmit a reminder directly to the viewer (e.g., text message, email, written correspondence, telephone call, etc.).

After blocks 334-336, decision block 338 follows, in which it is determined, based on processing the received viewer's selection, whether any other commerce commands are requested, which are subsequently processed at block 340 in the same or similar manner as one or more of the previously described commerce commands. It is appreciated that the aforementioned commerce commands are provided for illustrative purposes, and that any other desired commands associated with the advertised product or service may be initiated and/or completed by the method 300. Example commerce transactions may include, but are not limited to: ordering a pay-per view movie (or other video on-demand asset); adding a service to an existing or new service (e.g., adding a distribution network channel, adding a telephone line, adding broadband Internet service, etc.); automatic or customer-initiated provisioning of services; request or otherwise obtain a free offering or promotion (e.g., a coupon, a coupon code, a ticket, etc.); setting reminders and setting favorites on the same or different network; setting; and the like. For instance, in some of the aforementioned additional example commerce transactions, the "marketplace" and "marketplace system" may not necessarily refer to a retailer, but may include or otherwise refer to entities and/or systems associated with, but not limited to, a service provider (e.g., network channel, content provider, a different network operator system, a marketing entity, a third-party service provider, and the like.

After block 340 is block 342, in which the network operator system 102 may optionally transmit a follow-up text message to the viewer's mobile device 128 over the wireless network 108 to provide the viewer easier access to the commerce transaction or transactions initiated and/or completed in any of blocks 318-340, according to one embodiment, as described with reference to FIGS. 2A-2D. For example, a network text message may include one or more hyperlinks to a website operated by the marketplace. In other embodiments, a follow-up message may be transmitted over the distribution network 110 to a viewer device (e.g., the set-top box 122, the television 124, etc.), or over the Internet 112 (e.g., an email, etc.). The follow-up text message may be used to permit the viewer to interact directly with the marketplace system 106, such as, but not limited to, confirming the commerce transaction, reviewing the commerce transaction, adjusting the commerce transaction, finalizing the commerce transaction, completing the commerce transaction, providing additional information (e.g., payment, quantity, size, color, billing information, shipping information, etc.), rejecting the commerce transaction, or any combination thereof.

After block 342, operations continue to block 348, in which confirmation messaging is exchanged between the network operator system 102 and the marketplace system 106 for commerce transactions initiated and/or completed by this method. The confirmation messaging may enable the network operator system 102 to report to the marketplace system 106 the commerce transactions at least initiated by its operations, so the marketplace system 106 can provide the network operator system 102 with updated statuses for commerce transactions (e.g., completed, rejected, paid, etc.), to exchange accounting information, and the like. The operations performed at block 348 may be useful to facilitate the network operator system 102 in maintaining records and accounting of transactions it initiated or otherwise facilitated, such as when the network operator is able to collect a fee on transactions initiated, completed, etc. After block 348, for transactions that are at least initiated by the network operator system 102 with the marketplace system 106, as determined at decision block 316, the method 300 may end.

However, for the operations in which the network operator system 102 is not able to initiate the commerce transaction directly with the marketplace system 106, as determined at decision block 316, the above operations of blocks 318-342 are not performed; instead, blocks 344-348 are performed. At block 344, the network operator system 102 transmits a network text message to the viewer's mobile device with one or more hyperlinks to a website operated by the marketplace, according to one embodiment. In one embodiment, the URL underlying a hyperlink can be configured to identify the viewer's account, the product or service, the desired transaction, or any combination thereof. Therefore, when selecting the hyperlink at block 346, the viewer is automatically navigated to a marketplace webpage pertinent to the requested commerce transaction. For example, if the commerce transaction requested by the viewer is a request for more information, the URL may direct the viewer to a webpage displaying product information for the product or service. In another example, if the commerce transaction requested is a purchase transaction, the URL may direct the viewer to a "shopping cart" or "checkout" page, with instructions (e.g., calling an available web applet, etc.) that populate the desired product or service in the shopping cart, etc. Any amount of information may be transmitted by a URL, according to various examples, including, but not limited to, login credentials, product or service information, account information, and the like. In addition, according to one embodiment, the URL may further include an identifier of the network operator system 102, such as an alphanumeric string previously associated with the network operator system 102 by the marketplace system 106, that will permit the marketplace system 106 to log that the commerce transaction was initiated as a result of the network operator system 102. As discussed, identifying commerce transactions that were initiated or otherwise facilitated by the network operator system 102 will enable accounting for and collecting fees for the services provided.

According to another embodiment, instead of transmitting a network text message at block 344, the network operator system 102 may instead, or additionally, transmit a message over the Internet (e.g., via email, via a website, etc.) to the viewer that includes a hyperlink (or other access means) to the marketplace system 106. Moreover, according to one embodiment, the message transmitted at block 344 may not include a hyperlink, but may instead include a telephone number for the viewer to call for completing the commerce transaction or an address for the viewer to complete the commerce transaction by written correspondence. In yet another example, the message transmitted at block 344 may be transmitted to the viewer over the distribution network 110 to the viewer device (e.g., the set-top box 122), instead of, or in addition to, a network text message sent over the wireless network 108. In this embodiment, the viewer device may facilitate accessing the marketplace system 106 based on information provided over the distribution network 110, such as, but not limited to, accessing by a personal computer in communication with the viewer device, accessing by an IP television, etc.

After accessing the marketplace system (e.g., a webpage) at block 346, and performing the desired action with the marketplace, such as, but not limited to, confirming, rejecting, adjusting, and the like, operations continue to block 348. At block 348, confirmation messaging may be exchanged between the network operator system 102 and the marketplace system 106, as described above.

The method 300 may end after block 348, having enabled a viewer to complete a commerce transaction with a marketplace by messaging exchanged between the viewer, the network operator system, and the marketplace system.

Accordingly, the example systems and methods described herein provide for a network operator system to facilitate its viewers to conduct a commerce transaction with a marketplace. These systems and methods leverage the common desire for instant gratification and the general reluctance to exert the additional effort otherwise required to purchase a product. In addition, the increased popularity of, and enthusiasm for, text messaging using wireless phones and other mobile devices creates another purchase channel, use of which can be encouraged by distribution network operators. By providing a means to initiate and complete a purchase or other commerce transaction, while viewing television, these systems and methods will have the effect of increasing the sale and completion rate. Moreover, retailers and advertisers will be able to leverage the distribution network operators inherent knowledge of viewers' tendencies and interests, coupled with the well-categorized media content subject matter, to better target advertisements and offers to consumers. Thus, distribution network operators can encourage increased sales for marketplaces by facilitating the transactions as described herein, while also realizing an additional revenue stream from the marketplace for transactions the network facilitates. It is appreciated that these, and other advantages, will be apparent from the foregoing disclosure.

Various block and/or flow diagrams of systems, methods, apparatus, and/or computer program products according to example embodiments are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method for facilitating a purchase transaction over a distribution network, comprising:
   transmitting, by a network operator system comprising one or more computers over a distribution network, advertisement content associated with at least one product or service to a viewer device associated with a viewer, wherein the advertisement content presents at least one commerce command;
   receiving, by the network operator system, a selection of the at least one commerce command selected by the viewer; and
   transmitting, by the network operator system over a network other than the distribution network, at least one message to initiate a commerce transaction for the at least one product or service with a marketplace system responsive to receiving the selection of the at least one commerce command.

2. The method of claim 1, wherein the at least one commerce command comprises at least one of: (a) a purchase command; (b) an add to my favorites command; (c) an add to my wish list command; (d) a request for more information command; or (e) a reminder command.

3. The method of claim 1, wherein receiving the selection of the at least one commerce command comprises receiving a viewer text message at a text message server associated with the network operator system over a wireless network from a mobile device associated with the viewer.

4. The method of claim 3, wherein the at least one message to initiate the commerce transaction comprises at least one network text message transmitted over the wireless network to the mobile device.

5. The method of claim 4, wherein the at least one network text message comprises a hyperlink to a webpage associated with the marketplace system for initiating the at least one commerce command for the associated product or service with the marketplace system over the Internet using the mobile device upon selection of the hyperlink.

6. The method of claim 3, wherein the at least one message to initiate the commerce transaction comprises at least one command to the marketplace system to initiate the at least one commerce command for the associated product or service responsive to receiving the viewer text message.

7. The method of claim 6, wherein the at least one commerce command to the marketplace system is transmitted over the Internet.

8. The method of claim 3, wherein the at least one commerce command comprises a text string of alphanumeric characters comprising at least one of: (a) an indication of the at least one product or service; or (b) an indication of the at least one commerce command, and a number to which the text string is to be transmitted via the viewer text message.

9. The method of claim 1, wherein receiving the selection of the at least one commerce command comprises receiving an upstream message comprising the viewer's selection of the at least one commerce command from the viewer device over the distribution network.

10. The method of claim 9, wherein the viewer device comprises one of: (a) a set-top box; or (b) a network-connected television, and wherein the viewer's selection is made using a remote control interacting with the viewer device.

11. The method of claim 9, wherein the advertisement content presents at least one remote control selection for selecting the at least one commerce command.

12. The method of claim 9, wherein the at least one message to initiate the commerce transaction comprises at least one network text message transmitted from a text message server associated with the network operator system over a wireless network to a mobile device associated with the viewer.

13. The method of claim 12, wherein the at least one network text message comprises a hyperlink to a webpage associated with the marketplace system for initiating the at least one commerce command for the associated product or service with the marketplace system over the Internet using the mobile device upon selection of the hyperlink.

14. The method of claim 9, wherein the at least one message to initiate the commerce transaction comprises at least one command to the marketplace system to initiate the at least one commerce command for the associated product or service responsive to receiving the upstream message.

15. The method of claim 14, wherein the at least one command to the marketplace system is transmitted over the Internet.

16. The method of claim 1, wherein the at least one commerce command comprises at least one of: (a) ordering pay-per view audio/video content; (b) ordering a video on-demand asset; (c) requesting a service be added to an existing or new service; (d) provision a service; (e) request a promotional item; (f) set a reminder about network content on a same network; or (g) set a reminder about network content on a different network.

17. A system for facilitating a purchase transaction over a distribution network, comprising:
   a network operator system comprising at least one memory storing computer-executable instructions and at least one processor operable to execute the computer-executable instructions, the network operator system comprising a distribution network server in communication with a viewer device associated with a viewer over a distribution network and an interactive shopping server;
   wherein the at least one processor is operable to execute the computer-executable instructions to:
      transmit over the distribution network advertisement content associated with at least one product or service to the viewer device, wherein the advertisement content presents at least one commerce command;
      receive a selection of the at least one commerce command selected by the viewer; and
      transmit at least one message over a network other than the distribution network to initiate a commerce transaction for the at least one product or service with a marketplace system responsive to receiving the selection of the at least one commerce command.

18. The system of claim 17, wherein the network operator system further comprises a text message server operable to transmit network text messages over a wireless network to a mobile device associated with the viewer and to receive viewer text messages over the wireless network to the mobile device, wherein the transmitted network text messages present options regarding the at least one commerce command for the at least one service or product, and wherein the received viewer text messages indicate the viewer's selection of the at least one commerce command for the at least one service or product.

19. The system of claim 18, wherein the text message server is further operable to transmit at least one network text message that comprises one or more hyperlinks to one or more webpages associated with the marketplace system, wherein the one or more webpages enable completing the at least one commerce command for the associated product or service with the marketplace system over the Internet using the mobile device upon selection of the hyperlink.

20. The system of claim 17, wherein the interactive shopping server is operable to transmit at least one command to the marketplace system to initiate the at least one commerce command for the associated product or service.

21. The system of claim 20, wherein the network operator system further comprises a text message server, and wherein the interactive shopping server is operable to transmit the at least one command to the marketplace system responsive to receiving the selection of the at least one commerce command as at least one viewer text message is received at the text message server over a wireless network from a mobile device associated with the viewer.

22. The system of claim 20, wherein the interactive shopping server is operable to transmit the command to the marketplace system responsive to receiving the selection of the at least one commerce command from the viewer device over the distribution network.

23. The system of claim 22, wherein the viewer device comprises one of: (a) a set-top box; or (b) a network-connected television, and wherein the viewer's selection is made using a remote control interacting with the viewer device.

* * * * *